Oct. 11, 1927.  E. N. HODGES  1,645,001

GOLF TEE

Filed Feb. 19, 1927

INVENTOR
Edward N. Hodges
BY
his ATTORNEYS

Patented Oct. 11, 1927.

1,645,001

UNITED STATES PATENT OFFICE.

EDWARD N. HODGES, OF NEW YORK, N. Y.

GOLF TEE.

Application filed February 19, 1927. Serial No. 169,474.

This invention relates to a golf tee. I am well aware that heretofore golf tees have been constructed of divers materials and also in great variety as to shape and configuration. For example, golf tees have heretofore been made of rubber, wood, paper and metal, and so formed as to comprise either hollow or solid conical form with a concave upper surface so as to rest on the ground and to support a golf ball, and they have also been made to include a peg adapted to be forced or pushed into the ground and provided with a disk or other shaped head having a concave surface so that when the peg or stem is forced into the ground the head is adapted to receive and support a golf ball for the purpose of properly placing the golf ball in order to permit the player to strike the same with a golf club. In any of the particular types of golf tees to which I have already alluded, they tend to litter the teeing ground and adjacent surface of the golf course and must necessarily be removed after being discarded by the golfers, if the course is to be kept in proper order. I am also aware that heretofore, golf tees in divers forms have been made of a water soluble substance so that after being discarded they disintegrate and thus the necessity of removing them from the course is obviated.

Heretofore, the teeing grounds on golf courses were so constructed as to be entirely bare of grass. It is customary now, however, to have the teeing grounds covered with grass, and obviously, in the use thereof the grass becomes worn making it necessary to restrict the players to the use of different parts of the teeing ground at different intervals of time so that the grass will not be worn beyond resuscitation at any one place. Even with this restriction it will be obvious that it is difficult to properly maintain the grass on the teeing grounds irrespective of how much care may be devoted to so doing.

Now the object of my invention is the provision of a golf tee, the use of which will at least assist in the maintenance of teeing grounds and adjacent parts of the green as well as any and all parts of the fairways where it is permissible or when occasion makes it necessary to tee the ball. In carrying out the invention the tee made in accordance therewith is constructed of a composition of material with which there is mixed a quantity of seed, preferably grass seed, or a quantity of grass seed and a predetermined percentage of fertilizer. The material of which the seed or the seed and fertilizer are mixed is preferably such as to be soluble in water so that the dew or other dampness on the grass or in the ground after the tee has been used causes the same to disintegrate and permits the seed to enter the ground and to take root, and thus to assist in growing grass and maintaining the grass in a suitable condition on the teeing ground and other places as aforesaid. The golf tee made in accordance with my invention is preferably of the type in which there is a stem or shank adapted to be forced into the ground because in the use of this type of tee the ground is made more or less loose in the use of the tee and thereby the seeds are the better enabled to enter the ground and take root. The tee made in accordance with my invention may be in any suitable form.

In the drawing Figure 1 is an elevation of a form of golf tee in which the invention may be practised.

Figure 2:
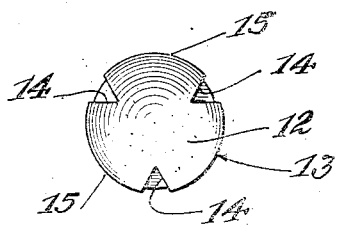
Fig. 2 is a plan of the same.
Figure 1:
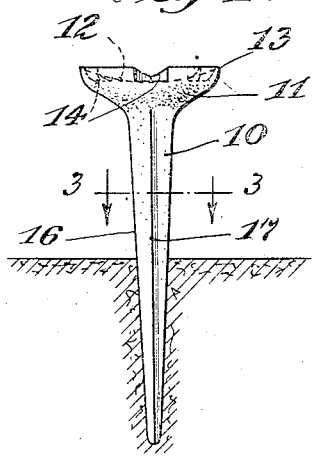
Figure 3:
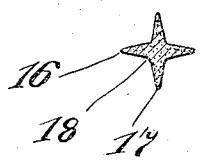
Fig. 3 is a cross section on line 3—3, Fig. 1.

Referring to the drawing and particularly to Figs. 1 to 3, the golf tee therein illustrated comprises a shank 10 which is preferably tapering and at its larger end is extended into a saucer shaped head 11. The upper face of this saucer shaped head is preferably concave as indicated at 12 and terminates in a peripheral ring 13. At the present time the prevalent type of golf ball is either dimpled, that is provided with recesses, or ribbed, that is provided with series of grooves making intervening ribs which may extend in predetermined directions around the surface of the ball. In order that the ball may be more securely seated in the saucer shaped head of the tee, the edges of the head may be notched or recessed as indicated at 14 causing spaced sections 15 in the edge of the rim to engage with the surface of the ball, these edge portions fitting into the dimples or the recesses in the surface of the ball. Furthermore, while the shank or stem may be of any configuration, I prefer to make the same with spaced edges as indicated at 16 and 17 providing intervening notches or recesses 18 to make easier the insertion of the stem in the ground.

Figure 4:
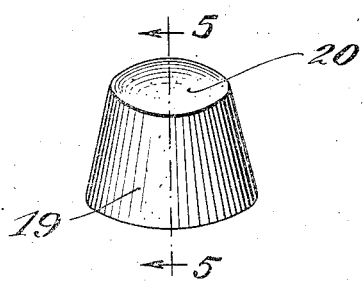
Fig. 4 is a perspective view of another form of golf tee, and Figure 5:
Fig. 5 is a section on line 5—5, Fig. 4.

Another form of golf tee in which the invention may be practised is illustrated in Figs. 4 and 5. In these figures the body of the tee as indicated at 19 is in the form of a truncated cone. The upper surface of the cone is recessed or concaved as indicated at 20. The base of this form of tee is adapted to be placed on the ground and the golf ball to be supported in the upper concave face thereof. It will be understood, however, that the forms of tees as illustrated and described are merely instances of the shape and configuration the tee may assume, as in carrying out the invention the tee may be of either one of these forms or any one of other numerous forms without departing from the nature and spirit of the invention.

In carrying out the invention irrespective of the shape of the tee, the article is made from a suitable composition with which there is mixed a certain quantity of seed, preferably grass seed with which when necessary or advisable, there may also be included a certain percentage of a fertilizer. The material is such that it may be mixed up in a plastic state and the grass seed or the grass seed and fertilizer mixed therewith, and if necessary, a binder material such as any adhesive substance may be added to cause the material to be of the desired consistency when dried. The material employed may be any gelatinous material such for example as animal tissues or fish scales and the like, or it may be of any suitable glutinous material such for example as the nitrogenous parts of wheat or any other grain, or when necessary to employ a binder the glutinous materials may be added to the gelatinous materials to cause the necessary adherence of the particles to each other to form a solidified structure when dry and molded. It will be understood, however, that the particular materials named are merely illustrative, as any viscous materials soluble in water and adapted for molding purposes may be employed in carrying out the invention. As hereinbefore stated, when the material is in its plastic state the grass seed or grass seed and a fertilizer are mixed therewith and when thus mixed in suitable proportions the material is placed in a mold made to form a tee of any desired configuration and the tee is thus formed. The tees made in this manner may be suitably dried by and in any natural or artificial manner, for example by placing them in the sun or in a suitable oven.

In the use of golf tees thus constructed and finally discarded by the player, the moisture either from the rain or dew or otherwise soon dissolves or disintegrates the tee, liberating the grass seed and permitting the same or the grass seed with the fertilizer to mix with the earth and permitting the grass seed to take root, tends to maintain the teeing grounds or other places where the tees are used in a condition in which the grass is always in sufficient quantity to have the teeing ground in a presentable and otherwise satisfactory condition. It will be understood that the present invention relates to the use of seed, preferably grass seed in conjunction with a device for teeing a golf ball in any manner in which the grass seed is or may be associated with the tee in such a manner that when the tee is discarded and subjected to the effects of moisture or water the seed is liberated and permitted to come into contact with or be associated with the earth in such a manner as to take root to thereby increase the growth of the grass on a golf course.

I claim as my invention:

1. A golf tee made of a material including seed and a viscous binding substance to make the article soluble in water.

2. A golf tee made of a material including seed, a fertilizer, and a viscous binding substance to make the article soluble in water.

3. A golf tee made of a material including grass seed and a viscous binding substance to make the article soluble in water.

4. A golf tee made of a material including grass seed, a fertilizer, and a viscous binding substance to make the article soluble in water.

5. A golf tee formed of flour and grass seed whereby the article is soluble in water.

6. A golf tee formed of flour, grass seed and a fertilizer whereby the article is soluble in water.

7. A golf tee made of flour, grass seed and an adhesive binding making the article soluble in water.

8. A golf tee made of flour, grass seed, a fertilizer, and an adhesive binding making the article soluble in water.

9. A golf tee including seed and a viscous material for normally maintaining the seed in association with the tee, the viscous material being water soluble whereby when the tee is subjected to moisture the seed is liberated for use.

Signed by me this 16th day of February, 1927.

EDWARD N. HODGES.